Patented July 23, 1940

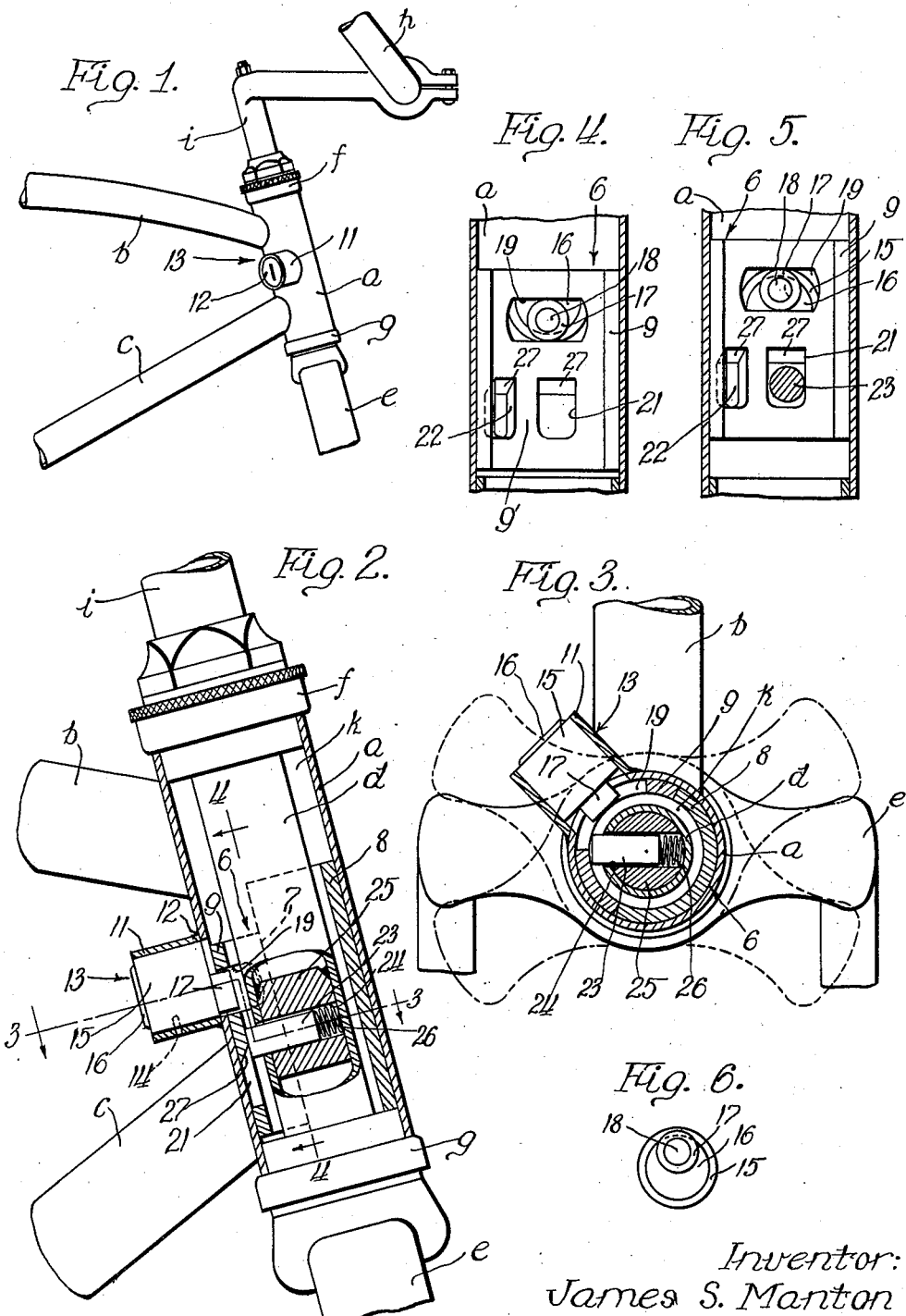

2,208,849

UNITED STATES PATENT OFFICE 2,208,849

BICYCLE LOCK

James S. Manton, Oak Park, Ill.

Application May 15, 1939, Serial No. 273,681

9 Claims. (Cl. 70—184)

My invention relates to locking means, and has to do more particularly with locking means suitable for use with bicycles and like structures.

In my patents, No. 1,998,512, granted April 23, 1935 and No. 2,073,217, granted March 9, 1937, I have disclosed bicycle locks of simple, inexpensive construction adapted for application to bicycles of known construction at small cost, the locks occupying the space within the head of the bicycle that had prior thereto not been utilized, and the locks when applied to the head avoiding unsightly projections and presenting a neat and attractive appearance. In both patents, the front wheel of the bicycle can be and is turned laterally, but in only one direction, out of the plane of the frame of the bicycle and the locking means locks the wheel in such position so that the bicycle cannot be ridden away, but can only be ridden in a circle.

Broadly, the present invention may be characterized as an improvement over the locking means shown in the patents above mentioned, and it is particularly concerned with the provision of simple and novel locking means whereby the front wheel of the bicycle can be turned, selectively, laterally out of the plane of the frame of the bicycle to either one of two positions, and locked in said position.

Specifically, invention in the instant case lies in certain features of construction, combination of elements and arrangement of parts which will be exemplified in the construction to be described and of which the scope of application will be indicated in the appended claims.

In the accompanying drawing, in which is shown the preferred illustrative embodiment of my invention:

Figure 1 is a fragmentary elevational view of a bicycle head with locking means in accordance with my invention applied thereto;

Figure 2 is a vertical sectional view through the head of the bicycle frame and associated parts, embodying the locking means of my invention, parts being shown in elevation and parts being broken away;

Figure 3 is a section taken substantially on line 3—3 of Figure 2, parts being shown in elevation;

Figure 4 is a section taken substantially on line 4—4 of Figure 2, and showing the inoperative position of a locking member;

Figure 5 is a view similar to Figure 4 but with the locking member in operative position; and Figure 6 is an end view of a cylinder lock.

By way of illustration, the locking means of my present invention is disclosed as applied to a bicycle having the usual frame comprising the tubular head $a$, an upper horizontal bar $b$, and a reach bar $c$, all rigidly secured together, as shown, in a known manner. Head $a$ receives stem $d$ of a fork $e$, within which is suitably mounted the front wheel (not shown) of the bicycle. Stem $d$ turns in known types of bearing structures mounted in the upper and lower ends $f$ and $g$, respectively, of head $a$. Handle bars $h$, which are disposed above the upper end of head $a$, have the depending shank $i$ thereof suitably secured to the stem $d$ in a known manner for steering purposes. Stem $d$ of fork $e$ is disposed in concentric spaced relationship to head $a$, leaving within the head space $k$ of appreciable width extending about the stem. The bicycle so far described is of known construction and the space $k$ within head $a$ is ordinarily not utilized for any useful purpose, the space being due to the mounting of stem $d$ in the bearing structures carried at $f$ and $g$, which is common practice in constructing bicycles of known type.

In applying the locking means of my present invention to a bicycle, I utilize the space $k$ for housing a tubular structure in the form of a sleeve 6. This sleeve extends around stem $d$, the inner surface of the sleeve being spaced from the stem, while the outer surface of the sleeve fits snugly the inner surface of head $a$. Sleeve 6 may be formed of any suitable or preferred metal, and it is split longtudinally for its full length, as indicated at 7, thereby providing an arcuate-shaped guide member 8 and an arcuate-shaped locking member 9. Guide member 8 is held stationary, being rigidly secured to the inner surface of head $a$ as by brazing, welding, or in any other suitable or preferred manner. Locking member 9 moves relatively to both head $a$ and guide member 8. As guide member 8 is held rigidly with respect to head $a$, it provides a bearing guide to maintain locking member 9 in firm contact with the inner surface of the head. Also, it restrains rotation of the locking member with respect to the head. Preferably, the guide member 8 is of greater length than locking member 9 to provide a bearing guide for the full length of said latter member in its movement longitudinally of the head in the manner hereinafter described.

A cylindrical collar 11 is brazed, as indicated at 12, or otherwise suitably secured to head $a$ and extends radially therefrom, the interior of this collar being in register with a corresponding opening through the head into the space $k$. A known pin type of cylinder lock 13 is received in collar 11 and secured therein as by the blind pin 14. This lock comprises a cylindrical barrel or casing 15 within which a cylinder 16 is mounted for rotation, this cylinder normally being locked against rotation by pins which can be released upon insertion of a proper key into the cylinder. A disc 17 is mounted upon the inner end of the cylinder by means of a pin 18, both the pin and disc being located eccentric to the axis of the cylinder. Inasmuch as lock 13 is of known construction, it need not be described in greater detail, it being sufficient to note that the lock is provided with a rotatable cylinder having, at its inner end, an eccentrically mounted disc, or equivalent member.

Adjacent its upper end, locking member 9 is provided with the transverse slot 19 for reception of disc 17. Preferably, the width of slot 19 is substantially equal to the diameter of the disc so that the disc has a relatively snug fit therein. The disc provides an operating connection between locking member 9 and cylinder 16. And, because of the eccentric mounting of the disc upon cylinder 16, rotation of said cylinder will cause longitudinal movement of locking member 9 with respect to head $a$. Adjacent its lower end, locking member 9 is provided with the laterally spaced openings 21—22. These openings are preferably substantially rectangular in cross-section, and are adapted, selectively, to receive one end of a locking pin 23.

As shown, pin 23 is carried in a lateral bore 24 formed in a metal plug 25, which plug is preferably forced into stem $d$ under pressure and brazed, welded, or otherwise suitably secured thereto. Pin 23 has free sliding movement in bore 24 and through an aligned opening in the stem $d$. A spring 26 disposed within the bore between the end of the pin and the wall of stem $d$ normally urges the pin outwardly of the bore into contact with locking member 9. The disposition of plug 25 in stem $d$ is such that the pin contacts locking member 9 immediately above the openings 21—22, when the locking member is in its lowered or normal position, as shown in Figure 2. When the wheel of the bicycle is in the plane of the bicycle frame comprising the bars $b$ and $c$, the pin will be disposed immediately above the portion 9' of the member 9 which separates the openings 21—22. Normally, one of the openings 21—22 will, therefore, be disposed on opposite sides of and below the pin 23, and engagement of pin 23 in one of the openings 21—22 will require raising of member 9 and turning of the front bicycle wheel so as to direct it laterally of the frame at an appreciable angle thereto. With the wheel so directed, and the pin engaged in one of the slots 21—22, the bicycle cannot be ridden straight ahead, but can be ridden in a circle only, the radius of which is determined by the angle at which the front wheel is set.

In order to engage pin 23 in one of the openings 21—22 and thereby lock the bicycle, the proper key is first inserted into cylinder 16, which is then rotated clockwise to move the locking member 9 longitudinally upwardly through the medium of disc 17 and slot 19. With the front bicycle wheel in a straight ahead position in the plane of bars $b$—$c$, the pin 23 at this time will contact portion 9' of the locking member. By then turning the front wheel clockwise to the position indicated by the dotted line in Figure 4, or by turning the front wheel counterclockwise to the position indicated by the dot and dash line of Figure 4, the openings 21 or 22, respectively, will be brought into register with the pin 23, and the pin automatically will move outwardly of bore 24 into the appropriate opening under influence of spring 26. Movement of the pin into openings 21 or 22 will, of course, be limited by contact of the pin with the inner surface of head $a$. To unlock the bicycle, it is only necessary to insert the proper key into cylinder 16 and rotate the cylinder counterclockwise. This returns the locking member 9 to its normal or lowered position. It will be noted that the upper transverse defining edges of openings 21—22 are beveled as indicated at 27. When the locking member 9 is moved downwardly, these edges contact pin 23 and force it out of the openings 21—22 and inwardly of the bore 24, where it is disposed behind locking member 9 in the manner above described.

I find that the provision of the herein described locking means which permits the front bicycle wheel to be turned in either one of two directions out of the plane of the bicycle frame, and locked in such positions, greatly facilitates the problem of parking the bicycle, especially when it is leaned against a wall, which is commonly the practice when the bicycle is temporarily parked. The provision of the spring pressed pin obviates the necessity of searching for the locked position of the wheel, that is, operating the lock and turning the wheel at the same time to bring a pin and slot into register before the lock could be fully operated, as heretofore been the case. Also, the spring pressed pin permits the use of what I term closed openings as distinguished from the slots which extend inwardly from one end of the locking member, as shown in the patents above referred to. With the pin engaged in one of the openings 21—22 neither the head nor the stem $d$ can be moved relatively to each other. No additional means is, therefore, necessary to obviate the danger of any one attempting to dismantle the head for the purpose of opening the lock.

The locking device of my invention is particularly suitable for use in bicycles and like structures, as pointed out above. I do not limit my invention to this single use, however, since it is well adapted for many other purposes, and is particularly suitable for use in connection with a tubular head or casing and a stem or equivalent member mounted for turning movement within the head or casing and spaced therefrom. It will also be understood, by those skilled in the art, that changes in construction and arrangement of parts of my invention may be resorted to without departing from the field and scope of the same, and I intend to include all such variations as fall within the scope of the appended claims, in this application in which the preferred form only of my invention is disclosed.

What I claim is:

1. In combination in locking means of the character described, a fixed tubular head, a stem extending into said head in concentric spaced relation thereto and mounted for turning movement, means comprising a curved locking member disposed between said stem and head and slidable lengthwise of the latter into operative and inoperative position, a locking element carried by said stem, said locking member having a plurality of openings therein spaced apart circumferentially and removed inwardly from all marginal edges thereof arranged for selective engagement by said locking element by rotation of said stem to different positions when the locking member is in operative position, and means operative to move said locking member into operative position and inoperative position and lock it in adjustment.

2. In combination in locking means of the character described, a fixed tubular head, a stem extending into said head in concentric spaced relation thereto and mounted for turning movement, means comprising a locking member disposed between said stem and head and slidable lengthwise of the latter into operative and inoperative position, a spring pressed locking element carried within said stem for projection therefrom, said locking member having a pair of laterally spaced openings therein and said locking element normally contacting said locking member at a point removed from said openings axially of said head when the locking member is in inoperative position, said locking element contacting the portion of the locking member between said openings when the locking member is moved to operative position whereby selective rotation of the stem in opposite directions will bring one of said openings into register with said locking element for projection of the latter thereinto, and means operative to move said locking member into operative position and inoperative position and lock it in adjustment.

3. In combination in locking means of the character described, a fixed tubular head, a stem extending into said head in concentric spaced relation thereto and mounted for turning movement, means comprising a locking member disposed between said stem and said head and slidable lengthwise of the latter into operative and inoperative position, a plug fixed in said stem and having a lateral bore, a locking element carried in said bore, means normally urging said locking element outwardly of said bore through an aligned opening in said stem into contact with said locking member, said latter member having openings arranged for selective engagement by the locking element when the locking member is moved to operative position, and means operative to move said locking member into operative position and inoperative position and lock it in adjustment.

4. In combination in locking means of the character described, a fixed tubular head, a stem extending into said head in concentric spaced relation thereto and mounted for turning movement, means comprising a locking member disposed between said stem and head and slidable lengthwise of the latter from a normally lowered inoperative position to a raised operative position, a plug fixed in said stem and having a lateral bore, a pin carried in said bore, a spring between one end of said pin and the wall of the stem normally urging the pin outwardly of the bore through an aligned opening in said stem into contact with the locking member, said latter member having openings arranged for selective engagement by the pin when the locking member is moved to raised operative position, and means operative to move said locking member into operative position and inoperative position and lock it in adjustment.

5. In combination in locking means of the character described, a fixed tubular head, a stem extending into said head in concentric spaced relation thereto and mounted for turning movement, a tubular structure disposed within the space between the stem and head, said tubular structure comprising a locking member and a fixed guide member providing a bearing guide for said locking member, said locking member having a plurality of openings formed therein and being slidable lengthwise of the head into operative and inoperative position, a pin yieldably carried by said stem and selectively engageable in said openings in the operative position of said locking member, a lock accessible exteriorly of said head, and operating connections between said lock and said locking member for moving the latter into operative position and inoperative position and locking it in adjustment.

6. In combination in locking means of the character described, a fixed tubular head, a stem extending into said head in concentric spaced relation thereto and mounted for turning movement, a sleeve disposed within the space between the stem and the head and with its outer surface snugly abutting the inner surface of said head, said sleeve being split for its full length to thereby provide a locking member and a guide member, said guide member being rigidly secured to said head and said locking member being slidable lengthwise of said head into operative or inoperative positions and guided and restrained from rotation during such movement by said guide member, a spring pressed pin carried by said stem and projecting therefrom, said locking member having a pair of laterally spaced openings selectively engageable by said pin in the operative position of said locking member, a lock accessible exteriorly of said head, and operating connections between said lock and said locking member for moving the latter into operative position and inoperative position and locking it in adjustment.

7. In combination in locking means of the character described, a fixed tubular head, a stem extending into said head in concentric spaced relation thereto and mounted for turning movement, a locking member provided with an opening and disposed between said stem and head to slide lengthwise of the latter into operative and inoperative position, a locking element carried within said stem and maintained in a retracted position therein by said locking member in the inoperative position of the latter, means projecting said locking element from its retracted position into the opening in said locking member in the operative position of the latter, and means operative to move said locking member into operative position and inoperative position and lock it in adjustment.

8. In combination in locking means of the character described, a fixed tubular head, a stem extending into said head in concentric spaced relation thereto and mounted for turning movement, a locking member provided with an opening and disposed between said stem and head to slide lengthwise of the latter into operative and inoperative position, a locking element carried within said stem, means operative to project said locking element from a retracted position in said stem into the opening in said locking member in the operative position of the latter, cam surfaces operative upon movement of said locking member from operative to inoperative position to return said locking element to its retracted position within said stem, and means operative to move said locking member into operative position and inoperative position and lock it in adjustment.

9. In combination in locking means of the character described, a fixed tubular head, a stem extending into said head in concentric spaced relation thereto and mounted for turning movement, a curved locking member provided with a plurality of circumferentially spaced apart openings disposed inwardly from all marginal edges thereof positioned between said stem and head to slide lengthwise of the latter into operative and inoperative position, a locking element carried by said stem, means operative to project said locking element from a retracted position in said stem into one of said openings upon rotation of the stem in different directions with the locking member in operative position, cam surfaces on said locking member adjacent each of said openings, the cam surface of the selected opening into which said locking element projects being operative to return said locking element to its retracted position within said stem upon movement of said locking member from operative to inoperative position, and means operative to move said locking member into operative position and inoperative position and lock it in adjustment.

JAMES S. MANTON.